3,639,359
ANIONIC POLYMERIZATION OF LACTAMS
Johan W. Garritsen and Sebastiaan E. M. Kooijman, Geleen, Johannes H. C. M. A. Gregoire, Beek(L), and Henny Verbrugge, Geleen, Netherlands, assignors to Stamicarbon N.V., Heerlen, Netherlands
No Drawing. Filed Mar. 21, 1969, Ser. No. 809,401
Claims priority, application Netherlands, Mar. 21, 1968, 6804056; Dec. 4, 1968, 6817424
Int. Cl. C08g 20/18
U.S. Cl. 260—78 L          8 Claims

ABSTRACT OF THE DISCLOSURE

A process for the anionic polymerization of lactams is disclosed, wherein the lactams are polymerized in the presence of a catalyst and a promoter, with the promoter being di - ε - caprolactim - ether - dihydrochloride or di - ε - caprolactim - ether - monohydrochloride, which latter compound may contain up to 90 mole percent of di - ε - caprolactim - ether. The promoters of the present invention allow the polymerization time to be reduced. The polymerization of lactams produces useful polyamides.

---

The present invention relates to the anionic polymerization of lactams in the presence of a catalyst and a promoter. The promoter is 0.1 to 2.0 or more mole percent of di - ε - caprolactim - dihydrochloride or di - ε - caprolactim-ether-monohydrochloride, which latter compound may contain up to 90 mole percent of di-ε-caprolactim-ether.

It is known that the anionic polymerization of lactams, which is usually carried out with the aid of an alkali metal compound catalyst, can be considerably accelerated by the addition of a promoter. The promoters that have been used for this purpose are nitrogen-containing compounds, such as isocyanates, carbodiimides and cyanamides. These promoters allow the polymerization to be carried out in a relatively short period of time at a temperature below the melting point of the polymer, so that, when lactams having at least four carbon atoms in the molecule ring are used, a solid product can be obtained which assumes the shape of the polymerization reaction chamber or vessel. The prior art has proposed to use di - ε - caprolactim - ether as the promoter in the anionic polymerization of lactams. However, polymerization using this promoter takes one-half hour or even longer, and polymerization times of such magnitude are generally too long for practical application.

The duration of the anionic polymerization of lactams, in which a lactam or a mixture of lactams is subjected to anionic catalytic polymerization in the presence of a promoter, can be considerably reduced if a di - ε - caprolactim-ether-hydrochloride is used as the promoter. Suitable promotors that can be used in this polymerization are di - ε - caprolactim - dihydrochloride, which can be prepared by the method described in German patent specification 917,669, the disclosure of which is hereby incorporated by reference, and di - ε - caprolactim - ether-monohydrochloride, which is a novel substance. The promoter may be a mixture of di - ε - caprolactim - ether with di - ε - caprolactim - ether - monohydrochloride, as long as at least 10 mole percent of the di - ε - caprolactim-ether-monohydrochloride, based on the total moles of promoter, is in said mixture.

Not only the ether structure, but also the tautomeric keto structure of dilactim ethers is known, and for this reason the present invention is not to be restricted to any theoretical chemical structure but is to be interpreted as including, within the term di - ε - caprolactim - ether-hydrochloride, not only the ether structure but also the tautomeric keto structure of the hydrochlorides.

In a preferred embodiment of the present invention, the promoter is dissolved in molten lactam, after which the resulting solution is heated for a given period of time, sometimes hereinafter called the "aging time," at a temperature of about 90–250° C. As a result of this so-called aging of the promoter, the duration of the polymerization is shortened. It is generally preferred to conduct the aging at the temperature at which the subsequent polymerization will be conducted, but it is possible to use a higher or lower temperature within the above temperature range of 90–250° C. if desired. An aging time of 15–45 minutes is usually sufficient for adequately aging the promoter, but longer periods of time, e.g., 5–10 hours, will not detract from the activity of the aged promoter. An aging time of at least 10 minutes, however, is required in order to produce an appreciable shortening of the polymerization time.

In an alternative embodiment of the present invention, di - ε - caprolactim - ether - hydrochloride is prepared from di - ε - caprolactim - ether and hydrogen chloride in a medium of molten lactam. Gaseous hydrogen chloride can be passed into a solution of di - ε - caprolactim-ether in the lactam, with the amount of hydrogen chloride limited by the amount of lactim ether present, so that no more than 2 moles of hydrogen chloride is introduced per mole of lactim ether. Such a procedure permits the simultaneous aging of the promoter. Instead of adding gaseous hydrogen chloride, it is also possible to use hydrogen chloride bound to a weak nitrogen base. Preferably, such a weak nitrogen base is a lactam-hydrochloride, wherein the lactam corresponds to the lactam which is to be polymerized. The promoter is obtained by adding such a lactam-hydrochloride to a solution of di - ε - caprolactim-ether in a lactam.

The promoter for the lactam anionic polymerization may be a mixture of di - ε - caprolactim - ether with at least 10 mole percent of di - ε - caprolactim - ether - monohydrochloride, as mentioned above. Such a mixture may be obtained by passing an inert gas, such as, for instance, nitrogen, at an elevated temperature, preferably in the range of 125–200° C., into a solution of di - ε - caprolactim-ether-dihydrochloride in the lactam to be polymerized, and continuing the passage of such inert gas until more than half of the hydrochloride has been separated off and carried away. The promoter mixture may also be obtained by heating a solution of di-ε-caprolactim-ether in the lactam to be polymerized, at a temperature above the melting point, suitably 75–100° C., and subsequently adding a quantity of lactam-hydrochloride corresponding to the desired quantity of the monohydrochloride in the resultant mixture. The lactam-hydrochloride reacts with the di - ε - caprolactim - ether to form essentially a molar equivalent amount of the desired monohydrochloride.

The use of at least 10 mole percent of di - ε - caprolactim-ether-monohydrochloride in admixture with di-ε-caprolactim-ether results in a polymerization with a much shorter reaction time than when di - ε - caprolactim - ether alone is used as the promoter. However, if the amount of di - ε - caprolactim - ether - monohydrochloride is smaller than about 10 mole percent, calculated on the amount of di-ε-caprolactim-ether, hardly any reduction in the polymerization time will be achieved.

The catalyst used in the anionic catalytic polymerization of lactam, in combination with the promoter, is suitably a lactam-N-anion, which may be obtained, for instance, from lactam-metal compounds containing a metal atom which is bound to the nitrogen atom, such as sodium caprolactam. It is preferred to add precursor substances to the lactam which is to be polymerized to form the lactam-N-anion catalyst in situ. The resultant lactam-N-anion contains a metal atom bound to the nitrogen atom of the lactam which is an alkali metal, an alkaline earth metal or a metal from Group II or III. Such precursor substances may be, for instance, Group II or III metal alkyl compounds, wherein the alkyl Group is a lower alkyl radical of 1–6-carbon atoms such as diisobutyl aluminium hydride, triethylaluminium, diethylaluminium chloride, triisopropyl aluminium and diethyl zinc. Alkali metals and alkaline earth metals and compounds thereof producing such metals by an alkaline reaction, such as alkali metal and alkaline earth metal hydrides, oxides, hydroxides, alkanolates (wherein the alkyl radical is a lower alkyl radical containing 1–6 carbon atoms) and carbonates, and also Grignard compounds, such as alkyl magnesium bromide and aryl magnesium bromide, may also be added to the lactam which is to be polymerized in order to produce the lactam polymerization catalyst in situ.

The catalyst may vary within wide limits, e.g., 0.1–10 mole percent, but is preferably within the range of 0.1–5 mole percent, based on the amount of monomer to be polymerized. Preferably, a substance is added to the lactam which, by reaction with the lactam, forms a lactam-N-anion, and the amount of such substance varies within the range of 0.1–10 mole percent, and preferably 0.1–5 mole percent based on the amount of lactam.

The amount of the promoter to be used may be varied within the range of 0.1–10 mole percent, and preferably within the range of 0.1–2 mole percent of the promoter with respect to the lactam. When large amounts, such as more than 10 mole percent, of the promoter are used, a lower degree of polymerization is obtained than when smaller amounts are used. If less than 0.1 mole percent of the promoter is used, the polymerization time will generally not be appreciably reduced.

The temperature at which the polymerization reaction is carried out may be within the range of 90–250° C., as is customary for the anionic polymerization of lactams. Preferably, an initial temperature of 125–175° C. is used, although the temperature may rise during the polymerization reaction, owing to the exothermic character of the reaction, and generally the reaction temperature remains below about 200–215° C. At such reaction temperatures, the polymerization, when using the promoter of the present invention, will be completed in a relatively short period of time, and often in a time period of less than 10 minutes.

If a temperature between the melting point of a lactam monomer and the melting point of the resultant polymer is used, the polymerization will yield solid macromolecular end products in the form of shaped products which correspond in dimensions to the dimensions of the reaction chamber or vessel in which the polymerization has been conducted.

The lactams which are polymerized by the present invention are omega lactams having 4 to 16 carbon atoms, such as butyrolactam, caprolactam, oenantholactam, caprylolactam, decyllactam, undecyllactam, or laurolactam, and also mixtures of 2, 3, or more of such lactams. If mixture of lactams are utilized, copolyamides are obtained, such as, by way of example, oenantholactam-caprolactam-laurolactam-copolyamide, laurolactam-oenantholactam-copolyamide, undecyllactam-caprolactam-copolyamide, caprolactam-caprylolactam - laurolactam-copolyamide, laurolactam-caprolactam-copolyamide and butyrolactam-caprolactam-copolyamide. The structure and properties of the resultant copolyamides are influenced by the composition of the starting monomer mixture, as is known to the art. The polymers produced by the process of the present invention may be used for the manufacture of special products, and may contain additional substances as is known to the art. One or more substances which affect the outward appearance and/or the properties of the polymer may be mixed with the starting material, as is conventional. For instance, dyestuffs and/or all kinds of fillers, such as wood meal, Carborundum, carbon black, powdered shale, coal dust, and coke breeze, may be distributed throughout the lactam melt. Natural and/or synthetic fibres, threads and/or fabrics made therefrom may also be incorporated in the lactam melt. In addition, macromolecular products, such as, for instance, polystyrene, polyformaldehyde, polypropylene, polyethylene, polyether and polyamides, and also polycondensation products of aldehydes with phenols, melamine and/or urea may be added to the melt to obtain macromolecular products with specific properties. Suitable blowing agents such as, for instance, hydrocarbons which vaporize at the polymerization reaction temperature, may be mixed with the starting products in order to obtain polymers with a cellular structure.

The invention will be understood more readily by reference to the following examples; however, these examples are intended to illustrate the invention and are not to be constricted to limit the scope of the invention.

EXAMPLE I(A)

Preparation of di-$\epsilon$-caprolactim-ether-dihydrochloride 113 g. of $\epsilon$-caprolactam were dissolved in 1.5 liters of benzene, after which 150 g. of phosgene were, over a period of 3 hours, passed into the solution with simultaneous stirring, the temperature of the solution being kept at 35–50° C. Thereafter, stirring was continued for 2 hours, after which the precipitated dihydrochloride was separated off by filtration and washed with diethyl ether. 125 g. of di-$\epsilon$-caprolactim-ether-dihydrochloride (melting point 119–120° C.; yield 85%) were obtained.

EXAMPLE I(B)

Preparation of di-$\epsilon$-caprolactim-ether-monohydrochloride 36.5 g. of dry hydrogen chloride gas was, over a period of one hour, passed into a solution of 208 g. of di-$\epsilon$-caprolactim-ether in 2 liters of benzene with simultaneous stirring, the temperature being kept at 15–25° C. Subsequently, stirring was continued for ½ hour, after which the precipitated monohydrochloride was separated off by filtration and washed with diethyl ether. 244 g. of di-$\epsilon$-caprolactim-ether-monohydrochloride (melting point 125° C.; yield about 100%) was obtained.

EXAMPLES I–XVI

Polymerization experiments with di-$\epsilon$-caprolactim-ether-monohydrochloride In the following experiments, the results of which are shown in Table I, 20 g. of the indicated lactam were polymerized in a glass cylinder (diameter 2.5 cm.) in which a rod or bar was formed. The cylinder was placed in an oil bath which was maintained at the reaction temperature set forth in Table I.

The promoter was dissolved in 10 g. of the lactam at the reaction temperature, with the solution maintained at the reaction temperature for the time indicated in Table I as the aging time. Thereafter, the aged solution was added to a solution of sodium hydride in 10 g. of the indicated lactam which was also maintained at the reaction temperature.

Various polymerization parameters were measured and checked. The time was measured from the addition of the promoter until the melt became so viscous that it would not show any flow (indicated in the table under "no flow") when the cylinder was inclined at an angle of 45°. The time was measured from the addition of the polymer until the melt became turbid, owing to crystallization of the polymer (indicated in the table under "turbid"). The time was also measured from the adddition of the promoter until the polyamide rod which was formed was free of the cylinder wall (indicated in the table under "free").

TABLE I

| Experiment No. | Lactam | NaH (mole percent) | Promoter (mole percent) | Temp. (° C.) | Aging time (min.) | No flow (min.) | Turbid (min.) | Free (min.) |
|---|---|---|---|---|---|---|---|---|
| 1 | Caprolactam | 1.5 | 0.6 | 150 | 15 | 4.7 | 5.2 | 10.3 |
| 2 | do | 1.5 | 0.6 | 150 | 120 | 5.0 | 7.3 | 9.0 |
| 3 | do | 1.5 | 0.6 | 150 | 300 | 6.0 | 7.0 | 10.2 |
| 4 | do | 4.5 | 1.5 | 140 | 30 | 0.5 | 0.7 | 3.0 |
| 5 | do | 1.0 | 0.6 | 150 | 30 | 8.5 | 9.2 | 14.0 |
| 6 | do | 1.5 | 0.6 | 150 | 30 | 4.2 | 5.2 | 9.0 |
| 7 | do | 2.1 | 0.6 | 150 | 45 | 3.0 | 4.0 | 8.0 |
| 8 | do | 2.7 | 0.6 | 150 | 45 | 2.5 | 3.5 | 6.5 |
| 9 | do | 2.5 | 1.0 | 150 | 30 | 2.0 | 2.5 | 7.2 |
| 10 | do | 2.7 | 0.6 | 150 | 0 | 11.7 | 14.5 | 20.2 |
| 11 | do | 2.1 | 0.6 | 150 | 0 | 16.7 | 20.2 | 23.5 |
| 12 | do | 0.9 | 0.3 | 175 | 30 | 3.5 | 9.2 | 20.5 |
| 13 | Oenantholactam | 1.5 | 0.6 | 150 | 30 | 5.5 | 6.0 | 7.0 |
| 14 | Caprolactam, 66% by weight; oenantholactam, 34% by weight | 1.5 | 0.6 | 150 | 30 | 3.0 | | |
| 15 | Caprolactam, 34% by weight; oenantholactam, 66% by weight | 1.5 | 0.6 | 150 | 30 | 3.7 | | |
| 16 | Caprolactam, 30% by weight; laurolactam, 70% by weight | 1.5 | 0.6 | 165 | 30 | 2.5 | | |

In the above table for Experiments 1–13, the amounts of sodium hydride and the promoter were calculated with respect to the lactam polymerized. In Experiments 14–16, wherein mixtures of lactams were used, the amounts of sodium hydride and the promoter were calculated with respect to 100% caprolactam. The products obtained from the polymerization of mixtures of lactams remained transparent at the reaction temperature.

EXAMPLES XVII–XX

Polymerization using di-ε-caprolactim-ether-dihydrochloride

Experiments were conducted in a manner similar to that described for Examples I–XVI, except that di-ε-caprolactim-ether-hydrochloride was used as the promoter. The results are shown in Table II below.

TABLE II

| Experiment No. | Lactam | NaH (mole percent) | Promoter (mole percent) | Temp. (° C.) | Aging time (min.) | No flow (min.) | Turbid (min.) | Free (min.) |
|---|---|---|---|---|---|---|---|---|
| 17 | Caprolactam | 2.1 | 0.6 | 150 | 30 | 4 | 4.5 | 9.2 |
| 18 | do | 3.0 | 0.9 | 150 | 60 | 2.5 | | 4.0 |
| 19 | do | 2.7 | 0.6 | 150 | 0 | 19.2 | 22.0 | 26.5 |
| 20 | do | 1.5 | 0.3 | 165 | 30 | 3.5 | 6.5 | 14.2 |

EXAMPLES XXI–XXIV

Polymerization experiments with promoter formed in situ from di-ε-caprolactim-ether and ε-caprolactam-hydrochloride Examples XXI–XXIV were conducted in a manner similar to that described for Examples I–XVI, except that the promoter was prepared from the in situ reaction of di-ε-caprolactim-ether and ε-caprolactam-hydrochloride. These latter two compounds were dissolved in 10 g. of caprolactam with the resulting solution being heated at 150° C.

for an aging time of 30 minutes. The polymerization results are shown in Table III below.

TABLE III

Polymerisation of ε-caprolactam

| Experiment No. | Caprolactam-hydrochloride (mole percent) | Di-ε-caprolactim-ether (mole percent) | NaH mole percent | Temp. (° C.) | Aging time (min.) | No flow (min.) | Turbid (min.) | Free (min.) |
|---|---|---|---|---|---|---|---|---|
| 21 | 0.6 | 0.6 | 1.5 | 150 | 30 | 4.5 | 6.2 | 9.0 |
| 22 | 1.2 | 0.6 | 2.1 | 150 | 30 | 3.0 | 5.0 | 7.5 |
| 23 | 1.0 | 1.0 | 2.0 | 150 | 30 | 3.2 | 4.0 | 5.0 |
| 24 | 0.8 | 0.4 | 1.5 | 150 | 30 | 4.0 | 4.2 | 10.5 |

EXAMPLES XXV–XXXVI

Polymerization with a mixture of di-ε-caprolactim-ether and di-ε-caprolactim-ether-monohydrochloride Experiments XXV–XXXVI were similar to those described above for Examples I–XVI, except that a mixture of di-ε-caprolactim-ether and di-ε-caprolactim-ether-monohydrochloride was used as the promoter. This mixture was obtained by dissolving the amounts of di-ε-caprolactim-ether and di-ε-caprolactim-ether-monohydrochloride in 10 g. of ε-caprolactam, with the resultant solution being heated at the reaction temperature for the period of time indicated under "aging" time in Table IV. Thereafter, the solution was added to a solution of sodium hydride in 10 g. of caprolactam, which solution was also maintained at the reaction temperature. The results are listed in Table IV below.

TABLE IV

| Test No. | Caprolactam-hydrochloride (mole percent) | Di-ε-caprolactim-ether (mole percent) | NaH (mole percent) | Temp. (° C.) | Aging time (min.) | No flow (min.) | Turbid (min.) | Free (min.) |
|---|---|---|---|---|---|---|---|---|
| 25 | 0.6 | 0.6 | 1.5 | 150 | 30 | 4.5 | 5.5 | 8 |
| 26 | 0.3 | 0.6 | 1.5 | 150 | 30 | 5.5 | 6.5 | 9 |
| 27 | 0.1 | 0.6 | 1.5 | 150 | 30 | 12.5 | 15.0 | 17.0 |
| 28 | 0.1 | 0.6 | 1.5 | 150 | 120 | 6.2 | 8.0 | 13.5 |
| 29 | 0.1 | 0.6 | 1.5 | 150 | 180 | 5.2 | 6.2 | 8.5 |
| 30 | 0.1 | 0.6 | 1.0 | 150 | 120 | 7.7 | 10.2 | 13.5 |
| 31 | 0.1 | 0.6 | 0.8 | 165 | 60 | 5.5 | 8.8 | 15.0 |
| 32 | 0.1 | 0.6 | 1.0 | 165 | 90 | 4.0 | 6.8 | 12.0 |
| 33 | 0.05 | 0.5 | 1.0 | 165 | 90 | 8.5 | 10.8 | 16.2 |
| 34 | 0.1 | 0.6 | 0.9 | 175 | 60 | 5.8 | 7.5 | 16.8 |
| 35 | 0.3 | 0.3 | 0.9 | 165 | 30 | 3.8 | 6.5 | 11.2 |
| 36 | 0.1 | 0.1 | 0.5 | 175 | 30 | 4.5 | 11.0 | 24.0 |

The mole percent quantities mentioned in Table IV above were calculated with respect to the quantity of lactam polymerized.

EXAMPLES XXXVII AND XXXVIII

Comparative experiments using di-ε-caprolactim-ether

For comparing the results obtained above with the use of di-ε-caprolactim-ether as a promoter in the anionic polymerization of lactam, comparative experiments, similar to those conducted for Examples I–XVI, were conducted using di-ε-caprolactim-ether as the sole promoter. The results are shown in Table V below.

TABLE V

| Experiment No. | Lactam | NaH (mole percent) | Promoter (mole percent) | Temp. (° C.) | Aging time (min.) | No flow (min.) | Turbid (min.) | Free (min.) |
|---|---|---|---|---|---|---|---|---|
| 37 | Caprolactam | 1.5 | 0.6 | 150 | 0 | 10.7 | 13.2 | 18.0 |
| 38 | do | 1.5 | 0.6 | 150 | 45 | 9.5 | 12.0 | 17.2 |

What is claimed is:

1. In a process for the anionic polymerization of at least one lactam of 4 to 16 carbon atoms to produce a solid macromolecular product, wherein said lactam is subjected to anionic catalytic polymerization in the presence of a metal lactam polymerization catalyst wherein the metal is selected from Groups I–III and a promoter at a temperature of about 90–250° C., the improvement comprising using, as said promoter, a member selected from the class consisting of di-ε-caprolactim-ether-monohydrochloride; di-ε-caprolactim-ether-dihydrochloride; and a mixture of di-ε-caprolactim-ether-monohydrochloride and di-ε-caprolactim ether in an amount of 0.1–10 mole percent based on the moles of lactam polymerized.

2. The process as claimed in claim 1, wherein the amount of said promoter is 0.1–2 mole percent.

3. The process as claimed in claim 1, wherein said promoter is di-ε-caprolactim-ether-dihydrochloride.

4. The process as claimed in claim 1, wherein said promoter is di-ε-caprolactim-ether-monohydrochloride.

5. The process as claimed in claim 1, wherein said promoter is prepared by adding hydrogen chloride, at a temperature of 90–250° C., to a solution of di-ε-caprolactim-ether in solution in said lactam, and the resulting promoter solution is employed in said polymerization.

6. The process as claimed in claim 5, wherein said hydrogen chloride is added in the form of hydrogen chloride bound to a weak nitrogen base.

7. The process as claimed in claim 6, wherein said weak nitrogen base is the lactam which is to be polymerized.

8. The process as claimed in claim 1, wherein said promoter is about 10–100% di-ε-caprolactim-ether-monohydrochloride and about 90–0% di-ε-caprolactim-ether.

References Cited

UNITED STATES PATENTS

| 2,241,321 | 5/1941 | Schlack | 260—78 L |
| 3,141,006 | 7/1964 | Kohan | 260—78 L |

FOREIGN PATENTS

| 84,819 | 3/1965 | France | 260—78 L |

WILLIAM H. SHORT, Primary Examiner

L. M. PHYNES, Assistant Examiner